Dec. 1, 1964  R. E. SCHORNSTHEIMER ETAL  3,159,517
METHOD OF MAKING MAGNETIC GASKETS
Original Filed Feb. 20, 1958  2 Sheets-Sheet 1

INVENTORS
ROBERT E. SCHORNSTHEIMER
BY THOMAS R. ROHRER
ATTY.

United States Patent Office 3,159,517
Patented Dec. 1, 1964

3,159,517
METHOD OF MAKING MAGNETIC GASKETS
Robert E. Schornstheimer, Marietta, and Thomas R. Rohrer, Coshocton, Ohio, assignors to The B. F. Goodrich Company, New York, N.Y., a corporation of New York
Original application Feb. 20, 1958, Ser. No. 716,482, now Patent No. 3,119,158, dated Jan. 28, 1964. Divided and this application July 16, 1962, Ser. No. 209,908
10 Claims. (Cl. 156—250)

This invention relates to magnetic gaskets and, more particularly, to an improved method of making such gaskets. The magnetic gaskets formed by this method are claimed in our copending application Serial No. 716,482, filed February 20, 1958, issued as Patent No. 3,119,158 on January 28, 1964, of which the instant application is a division.

Refrigerators, especially those of the type used in the home, employ a gasket or sealing means between the door and the body of the cabinet to cushion the door in closing, prevent the passage of air when the door is closed and provide a heat insulating barrier in this region. These gaskets are generally formed of rubber, synthetic plastic material, or other elastomeric material which have rubber-like properties so they can deform under pressure and thereby provide a seal between the cabinet and door even though there be irregularities in the surfaces of these members. Heretofore, it has been customary to form the gasket of a material and in a configuration such that considerable pressure is required to deform the gasket sufficiently to provide efficient sealing action around the entire door opening. This has made it necessary to utilize door latches which produce a strong clamping force. In an effort to avoid the need for such latches, attempts have been made to employ door gaskets requiring only a light compressive force to effect confirmation to the surfaces engaged, this force being supplied by magnetic means. Although such magnetic door gaskets have many advantages over the conventional combination of latch and stiff gasket, nevertheless, they did not at first receive wide acceptance. This was partly because the gaskets, in some cases, did not provide the necessary sealing action but, more importantly, because the cost of manufacture had been excessive.

The principal object of this invention is, therefore, to provide an improved method of making magnet-containing gaskets such that the gaskets have better sealing action and may be produced at lower cost than prior magnetic gaskets.

Another object of the invention is to provide an improved method of making a magnet-containing gasket such that the production and insertion of the magnets in the gasket are more rapidly and less expensively effected than heretofore, and flexibility of the gasket is achieved as the result of employing, in a hollow chamber of the gasket, magnets in the form of closely adjacent blocks of resin bonded finely-divided particles of magnet-forming material.

A more specific object of the invention is to provide an improved method of making a magnet-containing gasket by supporting and adhering to a flexible strip of material an elongated strip of resin bonded ferrite and then dividing the latter strip into a plurality of blocks in a manner which results in the blocks being closely adjacent but with sufficient spacing therebetween to provide transverse flexibility of the composite strip which is then inserted into the elongated hollow chamber of a resilient gasket.

Further objects and advantages of the invention will be apparent to those skilled in the art to which the invention pertains from the following description of the presently preferred embodiment described with reference to the drawings, forming a part of this application, and in which:

FIG. 1 is a perspective view of a portion of a strip of magnet-forming material;

FIGS. 2A and 2B, when joined on the dot-dash lines AA' and BB', comprise a schematic representation of the apparatus and steps employed in making an improved magnetic insert for a gasket;

Figure 4:
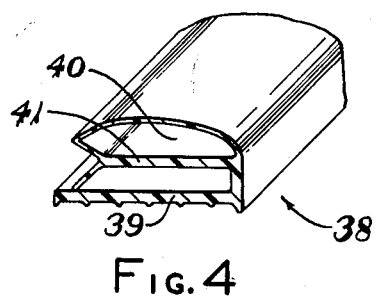
FIG. 4 is a fragmentary perspective view of a resilient gasket of flexible material which may be provided with magnetic means of the type illustrated in FIG. 3, the near end of the view being in transverse section.
Figure 3:
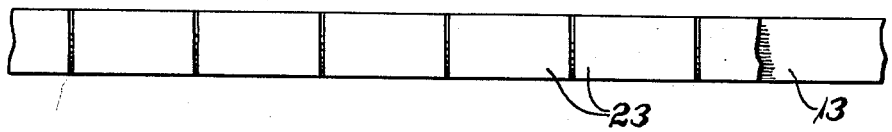
FIG. 3 is a plan view of a portion of the supported magnetic material produced by the apparatus and manipulations illustrated in FIGS. 2A and 2B.
Figure 5:
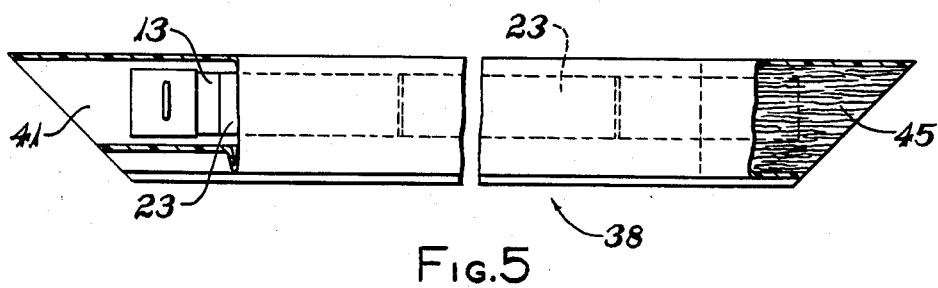
Figure 6:
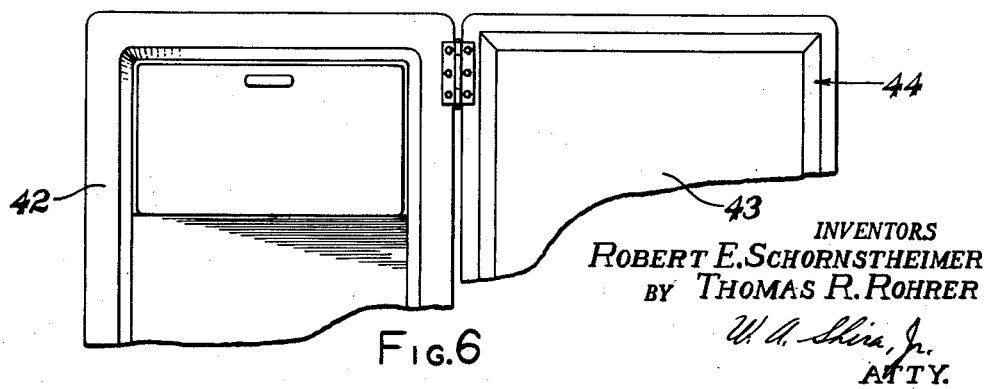

FIG. 5 is a fragmentary plan view of a portion of a gasket of the type shown in FIG. 4 provided with a magnetic means of the type shown in FIG. 3 with parts of the gasket broken away to further illustrate the nature of the completed gasket strip and the procedural steps followed in its manufacture; and FIG. 6 is a fragmentary front elevational view of a domestic refrigerator with the open door thereof provided with a gasket constructed in accordance with the invention.

Efficient sealing action between the cabinet and door of the refrigerator requires that the gasket assembly have a high order of flexibility so that it can accommodate to irregularities on the cooperating surfaces of the cabinet and door. Hence, the material and the configuration thereof employed for the gasket must be such that the latter is flexible and easily resiliently deformed. When the gasket contains magnets, they should be so arranged that the magnetic attraction is substantially uniform at all locations along the gaskets and this must be achieved without excessive loss of flexibility of the assembly. These requirements can be met by employing a large number of small, closely adjacent, magnets within the gasket. The production of such a magnet-containing gasket has, however, been difficult to achieve by known procedures.

In accordance with this invention, the magnets employed in the gasket are formed from finely-divided magnet-forming material united by a binder and shaped into an elongated strip which is then divided into discrete blocks. Preferably, the magnet-forming material is a ferrite and the binder is a synthetic resin. The particular ferrite and resin employed, as well as the percentages thereof, can, of course, be varied but the presently preferred composition, in terms of the weights of the components, is one comprising 90% ferrite and 10% vinyl resin. The resin may include a plasticizer in sufficient quantity to facilitate handling of the mixture as hereinafter explained.

Figure 1:
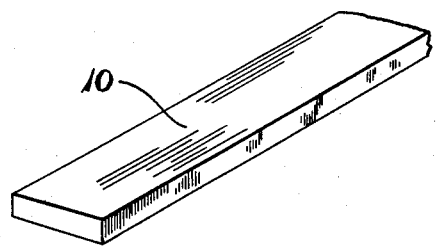

The magnet-forming material and binder are thoroughly mixed and subjected to sufficient heat and pressure to form an elongated strip 10, as illustrated in FIG. 1. This can be effected by providing the ferrite and resin in powder form which are mixed, milled, granulated and then extruded by conventional machinery of the type employed for fabricating synthetic resins. Apparatus of this type is well-known and, hence, need not be illustrated. As here shown, the strip 10 is rectangular in cross section with a width of approximately ½ inch and a thickness of approximately ⅛ inch. These dimensions are not critical, however, and the cross-sectional shape and dimensions are selected in accordance with the desired dimensions of the completed gasket.

The strip 10 may be led from the extruder or other apparatus in which it is formed directly through the subsequent operations which incorporate it as a part of a complete gasket, or the strip may be produced and subsequently incorporated into a gasket in two or more separate operations. The strip 10, when cooled after forming, has sufficient transverse flexibility that it can be coiled on a drum or reel without breaking provided the diameter thereof is large enough so that the strip is not subjected to small radius bending. However, the strip is sufficiently fragile so that it can be readily broken by notching or scoring and then bending it in an arc of small radius.

Figure 2A:
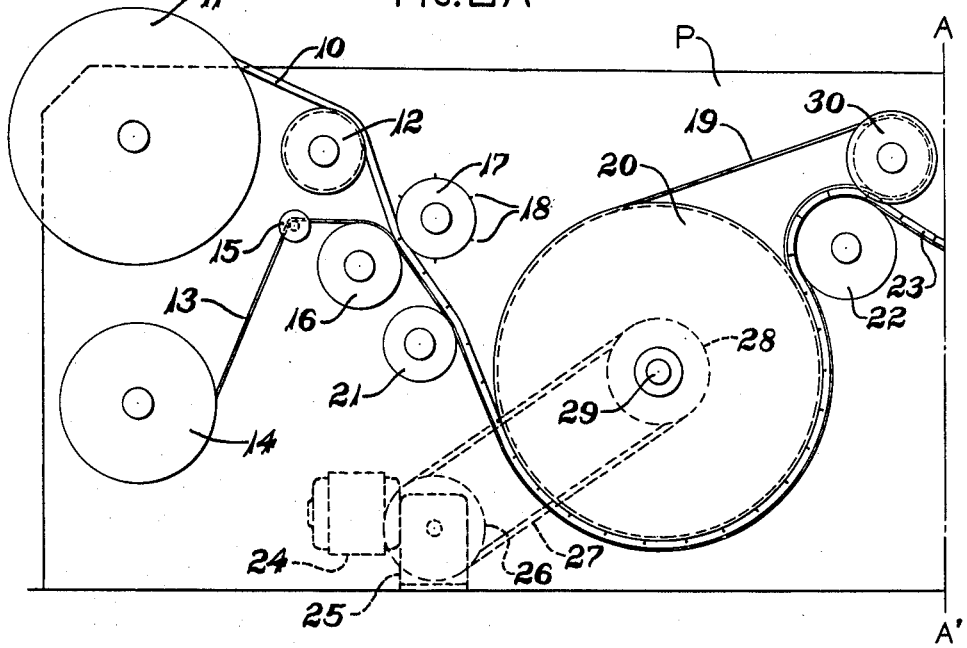
Figure 2B:
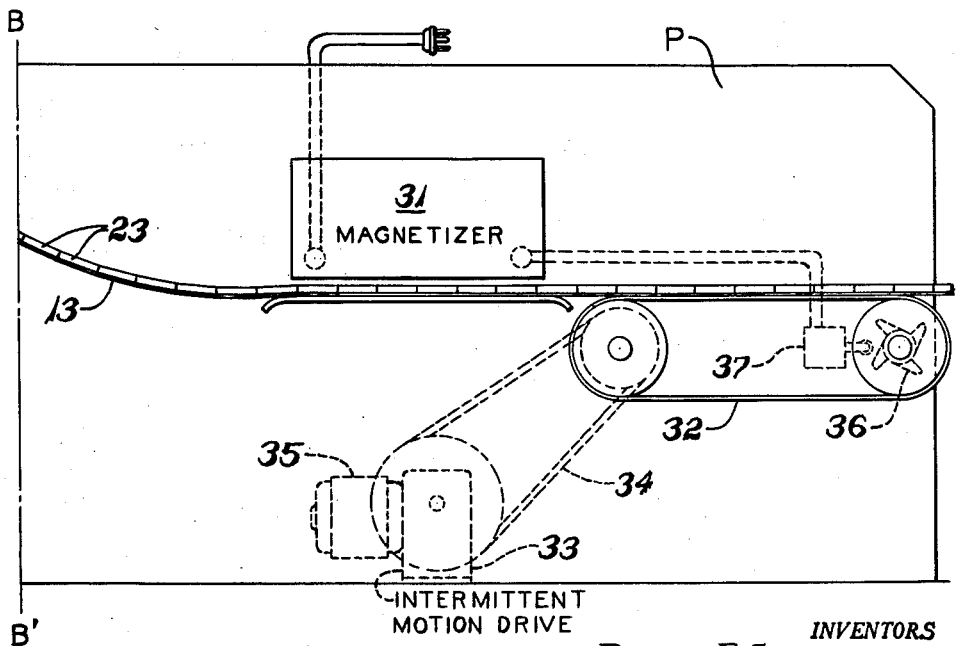

The strip 10 is converted into a plurality of small magnets and prepared for incorporation into a resilient gasket by a sequence of operations somewhat schematically illustrated in FIGS. 2A and 2B. As there shown, the strip 10 of magnet-forming material is disposed upon a reel 11 from which it is led over a guide wheel 12 that has side flanges to prevent runout of the strip. From the guide wheel 12 the strip 10 moves into contact with, and is adhered to, a supporting strip 13 of flexible material which is supplied from a reel or drum 14 and is guided into aligned relationship with the strip 10 by a suitable guide wheel or pulley 15. The strip of magnet-forming material 10 and flexible strip 13 are placed in superposed contact by passing between a pressure roll 16, which is preferably covered with rubber or other resilient material, and a notching wheel 17. The notching wheel 17 is formed of rigid material and has knife-like projections 18 extending radially therefrom at spaced locations about its periphery. The radial extent of the projections 18 is less than the thickness of the strip 10 so that the latter is provided with spaced transversely extending cuts or notches without separation of the strip into separate units.

The flexible strip 13 is provided with an adhesive substance and is fed with that substance on the side which contacts the strip 10 so that the two strips are adhered by their passage between the wheel or roll 16 and the notching wheel 17. Without limitation thereto, one suitable type of supporting strip 13 is a film of synthetic material, for example, a polyester, regenerated cellulose, or the like, coated with a pressure-sensitive adhesive. Thus, the strip 13 may be one of the commercially available pressure adhesive tapes. Alternatively, the strip 13 may be provided with a suitable adhesive just prior to its engagement with the strip of magnet-forming material.

After the magnet-forming strip 10 has been supported and notched, the composite strip then moves into contact with a belt 19 which is trained about a large diameter wheel or pulley 20. The composite strip engages the belt 19 with the notched surface of the strip 10 contacting the belt and with the supporting film or strip 13 on the external surface. In its passage from the notching wheel 17 to the wheel 20, the composite strip is supported by a guide wheel 21 similar to the guide wheel 12.

The guide wheels 12 and 21 are mounted by means, not shown, which permits adjustment of their axes of rotation in directions parallel to a line formed by the centers of the wheels 16 and 17. This enables the path of the strip 10 in its passage about the wheel 17 to be so regulated that the unnotched surface of the strip is under tension and thus slightly elongated when the strip 13 is applied thereto. The positions of the wheels 12 and 21 are so selected, in accordance with the dimensions and composition of the strip 10, that the tension and resulting elongation of the unnotched surface will provide the proper spacing of the discrete blocks into which the strip 10 is subsequently divided as hereinafter explained. Because the flexible strip 13 is outermost as the composite strip passes around the wheel or pulley 20, the strip 13 and the adjacent surface of the strip 10 are under tension. This tightens the strip 13 upon the strip 10 and tends to slightly further elongate the strip 10.

The composite strip is next carried by the belt 19 in a reverse curve around a smaller diameter break wheel or pulley 22 with the flexible strip 13 adjacent this wheel. The parts are so positioned that the composite strip is in contact with the wheel 22 through approximately ⅓ of its peripheral extent with the strip supported by the belt 19 so that the composite strip is held in engagement with the wheel. During this portion of its movement the strip of magnet-forming material is broken into discrete units or blocks 23. These are retained in adhesive engagement with the strip 13 but the blocks are spaced slightly adjacent their bases by virtue of the forces produced by passage of the strips 10 and 13 about the wheels 17, 21, 20 and 22 in the described sequence.

The several reels and wheels or pulleys thus far described are rotatably supported upon a suitable frame which is here shown as a vertically disposed plate P. Motion is imparted to the separate strips 10 and 13, and to the composite strip formed therefrom, by a driving means comprising a motor 24 and speed reduction unit 25. The output shaft of the unit 25 is provided with a pulley 26 which drives a belt 27 that is trained about and rotates a pulley 28 connected with the wheel 20 by the shaft 29. In the illustrated embodiment the supply reels for the strip materials and the pulleys or wheels over which the strips are led are located on one side of the supporting frame P with the driving means on the opposite side. This prevents interference between the strips and the driving mechanism.

The motion imparted to the wheel 20 by the driving means is transmitted to the composite strip through contact with the belt 19 which, as shown in FIG. 2A, extends around the wheel or pulley 20 and an idler wheel or pulley 30 with the break wheel 22 disposed between the pulleys 20 and 30 in a position such that the belt 19 is deflected in a reverse curve with the composite strip in engagement with the periphery of the break wheel for a substantial proportion of its arcuate extent. The tension imparted to the composite strip by virtue of the driving of belt 19 and wheel 20 is sufficient to move both the magnet-forming strip and the flexible strip 13 from their supply reels and to cause rotation of the wheel 16 and the notching wheel 17. However, if desired, additional driving means can be supplied for rotating the wheels 16 and 17 and separate feeding mechanisms can be employed for the strip 10 and also for the supporting film or tape 13. Appropriate driving and feeding mechanisms are conventional and their construction and use are well-known so that they need not be described or illustrated.

As the result of passing about the break wheel 22, the strip 10 is fractured at the location of each notch or scratch so that the strip is now in the form of discrete units or blocks 23 slightly spaced from each other. These blocks or units are, however, maintained in continuous strip form by virtue of the supporting strip or film 13. The spacing imparted to the units is made possible by the application of the strip 13 while the adjacent surface of the strip 10 of magnet-forming material is elongated, due to the adjustment of the guide wheels 12 and 21, as well as by the tightening of the strip 13 and the other forces exerted upon the composite strip during its passage about the wheels 20 and 22. The division of the strip 10 into separate blocks or units renders the composite strip sufficiently transversely flexible to permit it to readily conform to irregular surfaces when employed in a resilient gasket, as hereinafter explained.

The composite strip with the magnet-forming material in the form of discrete blocks or units 23 is next passed through a magnetic field to magnetize the blocks so that these become permanent magnets. The configuration of the magnetic field imparted to the blocks may be selected in accordance with the nature and degree of holding power required for the magnets. Thus, they may be magnetized with the adjacent ends of the separate blocks of either like or unlike polarity, or they may have opposite poles along the longitudinal edges, or each block or unit may have several sets of magnetic poles. The desired arrangement of the magnetic poles can be effected by employing an electrically energized magnetizing unit of known construction, which is here schematically indicated at 31. The unit 31 has a magnetizing field of proper configuration for the selected arrangement of poles, which field is momentarily energized through a condenser discharge so that a high intensity field of short duration is applied to the magnet-forming material.

The momentary application of the magnetic field is preferably effected while the composite strip is momentarily stationary within the field of force of the magnetizing means 31. This may be effected by employing a mechanism for moving the composite strip in a step-by-step motion and timing the energization of the magnetic field in synchronism with the movement of the material. The mechanism by which such an operation may be effected is schematically shown in FIG. 2B as comprising a conveyor belt 32, which is driven by an intermittent motion mechanism 33 through a belt 34 connecting the conveyor with a pulley on the output shaft of the mechanism 33. This mechanism 33 may be of any desired construction as, for example, that employing a Geneva motion operated by an electric motor 35. Synchronism of the operation of the magnetizing means 31 with the operation of the conveyor is achieved by providing a star wheel or rotary cam 36 upon one side of the head pulley for the conveyor 32, which cam operates a switch 37 that controls the magnetizing means.

The magnetizing means 31 and the conveyor 32 are so located relative to the break wheel 22 that sufficient slack can occur in the composite strip to provide for the fact that the strip is only intermittently moved beneath the magnetizing means, whereas it is continuously passing from the break wheel 22. That is to say, the spacing of the parts and the speed of operation are such that, when the conveyor 32 is stationary, the continuous movement of the break wheel 22 and of the driven wheel 20 produces a loop or slack in the composite strip, which loop or slack is substantially removed when the composite strip is moved by the conveyor 32. The construction of the cam 36 is such that as the conveyor 32 comes to rest, the switch 37 will be operated to cause energization of the magnetic means 30 and the latter is not in operation during the time when the conveyor 32 is moving the strip of material.

The operations described in conjunction with the apparatus schematically shown in FIGS. 2A and 2B produce a composite strip of discrete magnetized blocks supported upon a flexible backing as shown in FIG. 3. The next step of the process is to incorporate a length of this strip into the tubular chamber or cushion portion of a resilient gasket. The gasket may be formed of rubber, vinyl, or other elastomeric material in a variety of different configurations. One suitable type, designated 38, is shown in FIGS. 4 and 5 as comprising a base or attachment flange portion 39 and an integral longitudinally extending tubular portion or cushion 40 which provides a chamber that is approximately crescent shape in cross section and is sufficiently thin walled to readily deform under light pressure. The dimensions of the chamber in the cushion portion 40 of the gasket are such that the composite strip is accommodated therein with a space between the tops of the magnetic blocks and the outer wall of the gasket.

The insertion of a length of the composite strip material into the tubular or cushion portion 40 of the gasket may be effected by a variety of different procedures. For example, the gasket may be held substantially vertically and the composite strip dropped therein. Alternatively, the gasket may be placed in a substantially horizontal position and the composite strip pulled therethrough by a suitable member of cross sectional dimension less than that of the tubular portion 40 of the gasket. In either case, the operation is facilitated by the presence of the backing or supporting strip 13 which allows a plurality of discrete blocks 23 of magnetic material to be handled as a single unit.

After the composite strip has been inserted within the hollow chamber of the gasket, it is secured therein to the lower or base wall 41 of the chamber in the tubular portion 40 by any suitable expedient. As here shown, the strip is thus secured by allowing the supporting strip 13 to extend slightly beyond the end magnetic blocks 23 and stapling this extending portion to the wall 41. In place of stapling, a suitable adhesive or other means of fastening may be employed.

A plurality of lengths of resilient gasket material, supplied with the composite strips including the magnetic blocks, may be assembled into a complete gasket for refrigerators or other cabinets by uniting such strips into a rectangular or other configuration corresponding to that of the opening in the cabinet which is to be sealed. As shown in FIG. 6, the refrigerator cabinet 42 is provided with a door 43 to which is secured a rectangular gasket 44, each side of which is formed by one length of magnet-containing resilient gasket material of the type shown in FIG. 5. The union of the separate lengths of the gasket into a rectangular configuration of this type is preferably effected by mitering the adjacent ends so that they can be heat sealed together in substantially right-angle relationship. The mitering and uniting operation is facilitated by first inserting into the ends of the tubular portion 40 of each separate length of the gasket a short length or plug 45 of heat insulating material such as glass wool. These plugs provide a support for the walls of the hollow portion of the gasket thus facilitating cutting and uniting of the end portions. In addition, the plugs 45 somewhat stiffen the corners of the gasket thus preventing undesirable deformations thereof when attached to the door 43.

The refrigerator 42 or other cabinet provided with a magnet-containing gasket such as 44 does not require a latch to hold the door in closed position. This follows from the fact that the cabinets of refrigerators are conveniently made of steel and, hence, when the door with the gasket 44 is moved to a position in which the door substantially closes the opening to the cabinet, the magnetic attraction between the magnetic blocks 23 and the material of the cabinet 42 causes the door to be completely closed. Moreover, an effective seal is provided between the door and cabinet since the gasket is compressed or deformed by the attempts of the magnetic blocks to move into intimate contact with the cabinet 42. The flexible nature of the gasket material and the fact that the magnetic material is in the form of short discrete blocks permits the gasket to conform with surface irregularities of the cabinet and the door thus making an effective seal without the need of a strong clamping force. Moreover, the nature and construction of the magnet-containing gasket insures uniform sealing pressure throughout its entire extent in contrast to the forces exerted upon a conventional gasket when it is deformed by a door which is closed and secured by a single mechanical latch. Furthermore, the effective sealing action of the gasket is achieved with an increase of safety over that possible with mechanically operated latches since the door can be as easily opened from the interior as from the exterior.

The production of magnet-containing gaskets, in accordance with this invention, can be economically effected so that these gaskets can compete with conventional gaskets and latch-means heretofore employed. This is made possible by the fact that the formation of the separate blocks comprising the magnets in the completed gasket requires a minimum of hand operations and employs relatively inexpensive materials. Furthermore, the invention makes it unnecessary to provide a specially designed resilient gasket for receiving the magnets so that the best features of heretofore known gasket configurations can be employed.

The invention is susceptible of modifications and adaptations and is not limited except as may be required by the spirit and scope of the appended claims.

Having thus described the invention, we claim:

1. In the method of making a magnet-containing gasket the steps of providing an elongated strip of frangible magnet-forming material having cross-sectional dimensions suitable for insertion in the hollow interior of the gasket, supporting said strip on and adhering it to an elongated strip of flexible material, breaking said supported strip of magnet-forming material at longitudinally spaced locations without injury to the supporting strip to provide closely adjacent discrete blocks and subjecting said supported discrete blocks to a magnetic field of force such that the blocks become magnets.

2. The method of making a magnet-containing gasket comprising providing an elongated gasket of flexible material having a chamber extending lengthwise of the gasket and open at the ends, providing an elongated strip of frangible magnet-forming material having cross sectional dimensions suitable for insertion in the chamber of said gasket, supporting said strip on and adhering it to an elongated strip of flexible material, breaking said supported strip of magnet-forming material at longitudinally spaced locations without injury to the supporting strip to provide closely adjacent discrete blocks, subjecting said supported discrete blocks to a magnetic field of force such that the blocks become magnets, and inserting the supported magnetic blocks into the said elongated chamber of the gasket.

3. The method of making a magnet-containing gasket comprising providing an elongated gasket of flexible material having a chamber extending lengthwise of the gasket and open at the ends, providing an elongated strip of frangible magnet-forming material having cross sectional dimensions suitable for insertion in the chamber of said gasket, supporting said strip on and adhering it to an elongated strip of flexible material, breaking said supported strip of magnet-forming material at longitudinally spaced locations without injury to the supporting strip to provide closely adjacent discrete blocks, subjecting said supported discrete blocks to a magnetic field of force such that the blocks become magnets, inserting the supported magnetic strip in the said elongated chamber of the gasket, and securing the supporting strip to the bottom of the chamber in said gasket.

4. The method of making a magnet-containing gasket comprising providing an elongated gasket of flexible material having a chamber extending lengthwise of the gasket and open at the ends, providing an elongated strip of magnet-forming material having cross sectional dimensions suitable for insertion in the chamber of said gasket, the said magnet-forming material comprising a finely-divided ferrite united by a plastic binder, supporting said strip on and adhering it to an elongated strip of flexible material, breaking said supported strip of magnet-forming material at longitudinally spaced locations without injury to the supporting strip to provide closely adjacent discrete blocks, subjecting said supported discrete blocks to a magnetic field of force such that the blocks become magnets, inserting the supported magnetic blocks in the said elongated chamber of the gasket, and securing the supporting strip to the bottom of the chamber in said gasket.

5. The method of making a magnet-containing gasket comprising providing an elongated gasket of flexible material having a chamber extending lengthwise of the gasket and open at the ends, providing an elongated strip of frangible magnet-forming material having cross-sectional dimensions suitable for insertion in the chamber of said gasket, the said magnet-forming material comprising a finely-divided ferrite united by a plastic binder, notching said strip at spaced locations therealong, supporting said strip on and adhering it to on elongated strip of flexible material, bending said supported strip of magnet-forming material with the notches outwardly to break the material at the location of said notches without injury to the supporting strip thereby forming closely adjacent discrete blocks, subjecting said supported discrete blocks to a magnetic field of force such that the blocks become magnets, inserting the supported magnetic blocks into the said elongated chamber of the gasket, and securing the supporting strip to the bottom of the chamber in said gasket.

6. The method of making a magnetic gasket comprising providing an elongated strip of flexible gasket material formed with a longitudinally extending chamber open at the ends, providing an elongated frangible strip of finely-divided magnet-forming material united by a binder and having cross sectional dimensions suitable for insertion into the chamber of said gasket strip with a clearance between the top of the magnet-forming material and the top of said chamber, supporting said strip of magnet-forming material upon and adhering it to an elongated strip of flexible material, breaking said supported strip of magnet-forming material at longitudinally spaced locations without injury to the supporting strip thereby forming supported discrete blocks, subjecting said supported blocks to a magnetic field of force such as to magnetize said blocks, inserting the supported blocks into said elongated chamber of the gasket strip, securing the supporting strip to the bottom of the chamber in said gasket strip, preparing other gasket strips in like manner, and securing together a plurality of the thus prepared gasket strips to form a gasket of desired configuration with the elongated chamber therethrough provided with magnetic material in substantially all portions thereof.

7. The method of making a magnetic gasket comprising providing an elongated strip of flexible gasket material formed with an elongated chamber open at the ends, providing an alongated frangible strip of finely-divided magnet-forming material united by a binder and having cross sectional dimensions suitable for insertion in the chamber of said gasket strip with a clearance between the top of the magnet-forming material and the top of said chamber, supporting said strip of magnet-forming material upon and adhering it to an elongated strip of flexible material, breaking said supported strip of magnet-forming material at longitudinally spaced locations without injury to the supporting strip thereby forming supported discrete blocks subjecting said supported blocks to a magnetic field of force such as to magnetize the said blocks, inserting the supported magnetic blocks into the said elongated chamber of the gasket strip, securing the supported strip to the bottom of the chamber in said gasket strip, inserting short pieces of soft insulating material in the ends of the said chamber, preparing other gasket strips in like manner, and securing together the ends of said gasket strips to provide a gasket of desired configuration with the elongated chamber therethrough provided with magnetic material in substantially all portions thereof and with the corners of said gasket reinforced by soft insulating material.

8. The method of making a magnetic gasket comprising providing an elongated strip of flexible gasket material formed with a longitudinally extending elongated chamber open at the ends, providing an elongated frangible strip of finely-divided magnet-forming material united by a binder and having cross-sectional dimensions suitable for insertion in the chamber of said gasket strip with a clearance between the top of the magnetic material and the top of said chamber, notching said strip at spaced locations therealong, supporting said strip of magnet-forming material upon and adhering it to an elongated strip of flexible material, bending said supported strip of magnetic material with the notched surface outwardly to break the strip of magnet-forming material at the locations of the notches without injury to the supporting strip thereby forming supported discrete blocks, subjecting said supported blocks to a magnetic field of force such as to magnetize the said blocks, inserting the supported magnetic blocks into the said elongated chamber of the gasket strip, securing the supporting strip to the bottom of the chamber in said gasket strip, inserting short pieces of soft insulating material in the ends of the said chamber, preparing other gasket strips in like manner, and securing together the ends of said gasket strips to provide a gasket of desired configuration with the elongated chamber therethrough provided with magnetic material in substantially all portions thereof and with the corners of said gasket reinforced by soft insulating material.

9. The method of making a magnetic gasket comprising providing an elongated strip of resilient flexible gasket material formed with a longitudinally extending hollow chamber open at the ends, providing an elongated frangible strip of finely-divided magnet-forming material united by a binder and having cross sectional dimensions suitable for insertion into the said chamber of the gasket with a clearance between the top of the magnet-forming material and the top of said chamber, notching said strip of magnet-forming material at spaced locations therealong and adhering the latter to an elongated strip of flexible material, bending the resulting composite strip with the notched surface of the magnet-forming material inwardly and supported upon a flexible member, bending the composite strip with the notched surface of the magnet-forming material outwardly and while supported upon a flexible member thereby breaking the strip of magnet-forming material at the locations of the notches to provide discrete blocks united by the strip adhered thereto, magnetizing the said blocks, inserting the supported magnetic blocks into the said chamber of the gasket, and securing the supporting strip to the bottom of the chamber.

10. In the method described, the steps of providing an elongated strip of finely-divided magnet-forming material united by a binder, adhering said strip to an elongated strip of flexible material to form a composite strip, notching the strip of magnet-forming material at spaced locations therealong, bending the composite strip with the notched surface of the strip of magnet-forming material inwardly, thereafter bending the composite strip with the notched surface of the strip of magnet-forming material outwardly thereby breaking the strip of magnet-forming material at the locations of the notches to provide discrete blocks united by the strip adhered thereto, and then magnetizing said blocks.

References Cited by the Examiner
UNITED STATES PATENTS

| | | | |
|---|---|---|---|
| 744,245 | 11/03 | Semmer | 225—2 |
| 1,966,353 | 7/34 | McConnell | 225—2 |
| 1,978,220 | 10/34 | Otte | 148—108 |
| 2,389,298 | 11/45 | Ellis. | |
| 2,786,241 | 3/57 | Garvey et al. | 20—35 |
| 2,807,841 | 10/57 | Janos | 20—69 |
| 3,051,988 | 9/62 | Baermann | 18—12 |

EARL M. BERGERT, *Primary Examiner.*